June 9, 1959

E. M. BRADBURD 2,890,420

PULSE SHAPER CIRCUIT

Filed Nov. 23, 1953

INVENTOR
ERWIN M. BRADBURD
BY
ATTORNEY

United States Patent Office 2,890,420

Patented June 9, 1959

2,890,420

PULSE SHAPER CIRCUIT

Ervin M. Bradburd, Fairlawn, N.J., assignor to International Telephone and Telegraph Corporation, Nutley, N.J., a corporation of Maryland Application November 23, 1953, Serial No. 393,859

2 Claims. (Cl. 333—20)

This invention relates to electrical pulse shaping devices and more particularly to a circuit for generating a pulse whose shape is defined by the Gaussian error function.

In certain types of pulse transmitters, it is desirable to utilize a minimum spectrum for the radiated signal consistent with the transmission of the desired information. Examples of systems utilizing special shaper devices to obtain a minimum spectrum are pulse code modulation systems, Loran transmitters, certain types of aerial navigation systems, certain types of frequency shift keying systems and certain types of facsimile links. It is desirable in most of these systems to have a minimum pulse rise time with minimum output signal bandwidth.

The pulse shape having the minimum bandwidth for the minimum pulse rise time is that shape defined by the Gaussian error function. Linear filter networks heretofore employed for generating this pulse shape have the following disadvantages. First, to obtain a reasonable approximation of the Gaussian error curve pulse shape, there is required so many filter sections that the insertion loss of the arrangement is high. Second, the time delay of such a filter configuration is quite large. From a theoretical viewpoint, infinite time delay is required to obtain an exact error function pulse shape output. Third, to obtain the Gaussian error pulse shape with conventional filters giving low undershoot on the output pulse adds to the number of filter sections required for the desired pulse shaping.

Therefore, it is an object of this invention to provide a pulse shaper circuit to generate pulses having a shape defined substantially by the Gaussian error function utilizing a minimum of circuit components.

Another object of this invention is the provision of a pulse shaper circuit which acts upon a square wave of energy for producing an output pulse therefrom having a shape defined substantially by the Gaussian error function.

A feature of this invention is to provide a non-linear pulse shaper network for producing a substantially Gaussian error function pulse wave form from an activating square wave pulse of energy.

Another feature of this invention is to provide a unidirectional device disposed internally of a non-linear pulse shaping network for removal of trailing undershoots from the generated Gaussian error function pulse waveform.

Figure 1:
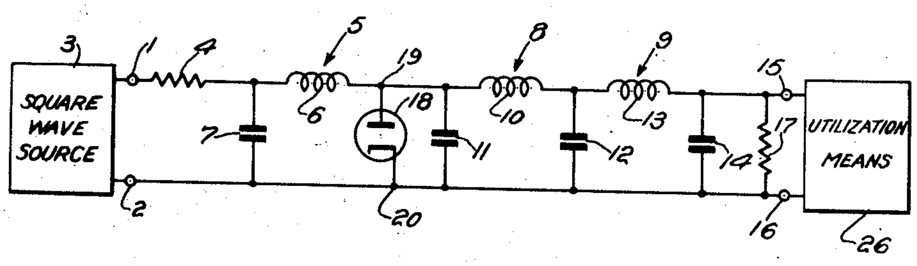
Figure 2:
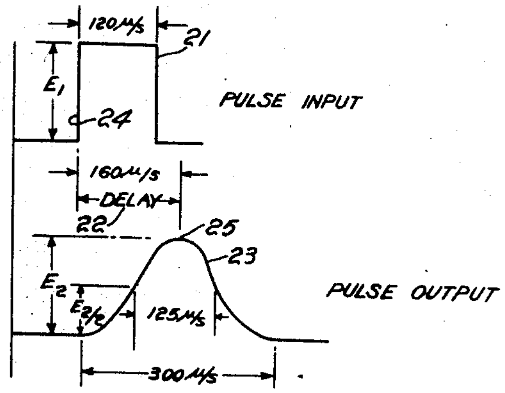

The above-mentioned and other features and objects of this invention will become more apparent by reference to the following description taken in conjunction with the accompanying drawings, in which:

Fig. 1 is a schematic diagram of the pulse shaping network in accordance with the principles of this invention; and Fig. 2 is a graphical representation of the video spectrum resulting from the network of Fig. 1 as compared to the activating pulse wave.

Referring to Fig. 1, there is illustrated therein a pulse shaping network in accordance with the principles of this invention employed to generate pulses having a shape defined substantially by the Gaussian error function. The pulse shaping network is shown to comprise input terminals 1 and 2 having connected thereto a source of square wave energy 3. The square wave energy from source 3 is coupled through terminals 1 and 2 to input resistance 4 disposed in a series relationship with respect to the signal of source 3. Following resistor 4, the energy of source 3 encounters a first filter section 5 of L-type filter configuration including an inductance 6, in series with resistor 4, and a condenser 7 in a shunt relation to the signal of source 3. Following filter section 5 the network comprises a second filter section 8 of $\pi$-type filter configuration and a filter section 9 of L-type configuration. Filter section 8 includes therein a series inductance 10 and shunt capacitance 11 and 12, one each located at the extremities of inductance 10, while filter section 9 includes a series inductance 13 and a shunt condenser 14 so disposed to be in a shunt relation with the signal traveling through the network. Output terminals 15 and 16 have shunted thereacross and in a parallel relationship with condenser 14 a terminating resistance 17 to cooperate in preventing reflections in the shaping network. The resultant shaped pulse will be coupled to the ultimate point of utilization, represented by the block identified as utilization means 26, from terminals 15 and 16.

The network hereinabove described is a non-linear filter network wherein a rectangular pulse from source 3 is applied to the input terminals. If diode 18 were absent the pulses of source 3 would produce a voltage at points 19 and 20 having pronounced trailing undershoots. This undesirable undershoot would propagate through the remaining filter sections 8 and 9 and would appear at the output terminal. It has been discovered, however, that the inclusion of diode 18 at an internal point of the network, such as between filter sections 5 and 8, functions to clip the undersirable undershoot of the shaped pulse at points 19 and 20 with the following filter sections 8 and 9 removing the high frequencies generated by the clipping action.

In Fig. 2 there is illustrated a representative square wave of energy at 21. The action of the network including diode 18 is to cause a certain time delay, as represented at 22 in Fig. 2, between the leading edge of square wave pulse 21 and the peak of the output pulse 23. When the circuit of Fig. 1 is properly adjusted, no undershoots on the output pulse are noticed. Furthermore, within broad limits, the shape of the output pulse is substantially independent of the duration of the input pulse, but has an amplitude which is a function of the input pulse duration.

The resistors 4 and 17 are of critical value if complete freedom from undershoot is to be obtained. Furthermore, the diode resistance when conducting should be less than $\frac{1}{10}$ that of the network load resistance. One possible combination of circuit parameters resulting in a satisfactory pulse shape is illustrated in Fig. 1 with the value of the parameters therein listed below.

| | | |
|---|---|---|
| Inductance **6** | mh | 50 |
| Inductance **10** | mh | 60 |
| Inductance **13** | mh | 31.5 |
| Capacitance **7** | μf | 0.03 |
| Capacitance **11** | μf | 0.0446 |
| Capacitance **12** | μf | 0.0436 |
| Capacitance **14** | μf | 0.028 |
| Resistance **4** eq. Resistance **17** | ohms | 1,100 |

The video spectrum of a Gaussian error function shape resulting from this representative pulsing network is shown in Fig. 2 as compared with the input square wave of energy. If pulse 21 has a duration of 120 microseconds, the delay between edge 24 of pulse 21 and the peak 25 of output pulse 23 will be approximately 160 microseconds, and the duration or pulse width of pulse 23 at half the amplitude of the resulting pulse or the half power points (6 db down from the peak power), is approximately 125 microseconds, employing the circuit parameters outlined hereinabove. Thus, a Gaussian error function pulse is generated to enable the desired conservation of bandwidth for use in pulse communication systems. The above example of parametric values are only representative and other parameter values are likewise possible with the internal inclusion in all cases of the diode 18 to clip and shape the pulse in the filter network. The value indicated hereinabove for the parameters of this pulse shaping network can be scaled for different load impedances and pulse durations in accordance with the well-known relationships:

$$\text{Pulse duration} = t \sim \sqrt{LC}$$

$$\text{Load impedance} = R \sim \sqrt{\frac{L}{C}}$$

While I have described above the principles of my invention in connection with specific apparatus, it is to be clearly understood that this description is made only by way of example and not as a limitation to the scope of my invention as set forth in the objects thereof and in the accompanying claims.

I claim:

1. A Gaussian error function pulse shaper comprising a source of rectangular voltage pulses having a given time duration, a first low pass filter section including a first capacitance connected in shunt relation to the voltage of said source and a first inductance connected in series relation to the voltage of said source, a second low pass filter section including a second inductance connected in series relation to said first inductance, a second capacitance connected at the junction of said first and second inductances and in shunt relation to the voltage of said source and a third capacitance connected to the end of said second inductance removed from said second capacitance and in shunt relation to the voltage of said source, a third low pass filter section including a third inductance connected in series relation to said second inductance at the junction of said second inductance and said third capacitance and a fourth capacitance connected to the end of said third inductance removed from said third capacitance and in shunt relation to the voltage of said source, a first resistance connected in series between said first inductance and said source to couple the voltage of said source to said first inductance, a second resistance equal substantially to the composite characteristic impedance of said first, second and third filter sections connected in parallel to said fourth capacitance to remove the Gaussian error function shaped pulse without reflection, the impedance of each of said filter sections relative to each other preventing internal reflections therein, and a diode connected at the junction of said first and second inductances and in shunt relation to the voltage of said source to remove undershoots from said shaped pulses, the values of the above-named components of said shape being scaled to produce a Gaussian error function pulse for different time durations of the rectangular pulse of said source and for different load impedances for said shaper using the following values as a basis and by employing the following relationships:

$$t \sim \sqrt{LC} \text{ and } R \sim \sqrt{\frac{L}{C}}$$

where t is equal to the time duration of the voltage pulse of said source, R is equal to the load impedance of said shaper, L is equal to the value of the inductance, and C is equal to the value of the capacitance; said first inductance being equal to 50 millihenries, said second inductance being equal to 60 millihenries, said third inductance being equal to 31.5 millihenries, said first capacitance being equal to 0.03 microfarad, said capacitance being equal to 0.0446 microfarad, said third capacitance being equal to 0.0436 microfarad, said fourth capacitance being equal to 0.028 microfarad, said first and second resistances each being equal to 1100 ohms, and the resistance of said diode when conducting being equal to no greater than 110 ohms when the time duration of the rectangular pulse of said source is equal to 120 microseconds and the load impedance of said shaper is equal to 1100 ohms.

2. A Gaussian error function pulse shaper comprising a source of rectangular voltage pulses having a given time duration, a first low pass filter section including a first capacitance connected in shunt relation to the voltage of said source and a first inductance connected in series relation to the voltage of said source, a second low pass filter section including a second inductance connected in series relation to said first inductance, a second capacitance connected at the junction of said first and second inductances and in shunt relation to the voltage of said source and a third capacitance connected to the end of said second inductance removed from said second capacitance and in shunt relation to the voltage of said source, a third low pass filter section including a third inductance connected in series relation to said second inductance at the junction of said second inductance and said third capacitance and a fourth capacitance connected to the end of said third inductance removed from said third capacitance and in shunt relation to the voltage of said source, a first resistance connected in series between said first inductance and said source to couple the voltage of said source to said first inductance, a second resistance equal substantially to the composite characteristic impedance of said first, second and third filter sections connected in parallel to said fourth capacitance to remove the Gaussian error function shaper pulse without reflection, the impedance of each of said filter sections relative to each other preventing internal reflections therein, and a diode connected at the junction of said first and second inductances and in shunt relation to the voltage of said source to remove undershoots from said shaped pulse, the components of said shaper having the following values when the rectangular voltage pulse of said source has a time duration equal to 120 microseconds and the load impedance of said shaper is equal to 1100 ohms, said first inductance being equal to 50 millihenries, said second inductance being equal to 60 millihenries, said third inductance being equal to 31.5 millihenries, said first capacitance being equal to 0.03 microfarad, said second capacitance being equal to 0.0446 microfarad, said third capacitance being equal to 0.0436 microfarad, said fourth capacitance being equal to 0.028 microfarad, said first and said second resistances each being equal to 1100 ohms and the resistance of said diode when conducting being equal to no greater than 110 ohms.

References Cited in the file of this patent

UNITED STATES PATENTS

| | | |
|---|---|---|
| 1,603,329 | Dietze | Oct. 19, 1926 |
| 1,720,023 | Vreeland | July 9, 1929 |
| 2,024,900 | Wiener et al. | Dec. 17, 1935 |
| 2,262,468 | Percival | Nov. 11, 1941 |
| 2,452,013 | Friend | Oct. 19, 1948 |
| 2,539,465 | Parker | Jan. 30, 1951 |
| 2,552,348 | Shapiro et al. | May 8, 1951 |
| 2,631,232 | Baracket | Mar. 10, 1953 |
| 2,680,153 | Boothroyd et al. | June 1, 1954 |
| 2,719,237 | Krienen | Sept. 27, 1955 |
| 2,732,528 | Anderson | Jan. 24, 1956 |

FOREIGN PATENTS

| | | |
|---|---|---|
| 475,446 | Great Britain | Nov. 19, 1937 |
| 693,769 | Great Britain | July 8, 1953 |
| 893,510 | Germany | Oct. 15, 1953 |

OTHER REFERENCES

Meachem et al.: An Experimental Multi-channel Pulse Code Modulation System etc., Bell Sept. Tech. Jour., vol. 27, pp. 1–43 (especially pp. 10–13) (January 1948).

Sylvania Electric Products Inc. pamphlet "40 Uses for Germanium Diodes," Mar. 11, 1952, pages 34, 35. (Copy in Div. 69.)